United States Patent [19]

Billings et al.

[11] 3,914,625

[45] Oct. 21, 1975

[54] ZERO CROSSOVER CIRCUIT

[75] Inventors: William W. Billings; Lynn L. Tipton, both of Lima, Ohio

[73] Assignee: Westinghouse Electric Corporation, Pittsburgh, Pa.

[22] Filed: Aug. 13, 1973

[21] Appl. No.: 387,992

[52] U.S. Cl. ....... 307/235 R; 307/252 UA; 307/311; 323/36

[51] Int. Cl. .............................................. H03k 3/00

[58] Field of Search ......... 307/235 R, 133, 252 UA, 307/311; 323/21, 36

[56] References Cited

UNITED STATES PATENTS

| | | | |
|---|---|---|---|
| 3,693,027 | 9/1972 | Garaway | 323/21 X |
| 3,758,844 | 9/1973 | Harkenrider et al. | 307/252 UA |

*Primary Examiner*—John Zazworsky
*Attorney, Agent, or Firm*—G. H. Telfer

[57] ABSTRACT

A zero crossover detecting circuit is provided including a halfwave rectifier developing halfwave rectified signals from the AC supply, the halfwave rectified signal energizing a capacitor, and a logic gate or other voltage level detector connected to be responsive to the charged condition of the capacitor to produce an output pulse when the voltage to the input of the logic gate is at least a predetermined value in relation to the voltage occurring at the same time across the capacitor. This zero crossover circuit requires no power to be supplied apart from the AC voltage and may be used in power controllers where it makes possible precise control of the switching of solid state switches such as thyristors.

3 Claims, 4 Drawing Figures

ZERO CROSSOVER CIRCUIT

BACKGROUND OF THE INVENTION

This invention relates to electronic circuitry and particularly to zero crossover circuitry for producing a signal upon occurrence of a predetermined zero crossing of an AC waveform.

Zero crossover circuits are know in the art. They are used to produce a pulse upon the occurrence of a zero crossing of a AC waveform and are particularly useful in applications such as solid state (thyristor) switching circuits in which the application of switching signals to the switch is advantageously done within close limits of the zero crossing. In the normal case it is one of the zero crossings of a complete period of the AC wave that is of interest such as the positive to negative going zero crossing.

Various zero crossover circuits have been previously designed and used. They include circuits whose performance capability is satisfactory for most purposes. They are characterized, however, by requiring a DC voltage supply for their energization besides the AC voltage waveform on which the circuit works. In many applications the provision of such a direct voltage supply presents no particular problem. However, in other applications the requirement for such a separate supply is a serious disadvantage.

In copending application Ser. No. 387,991, filed Aug. 13, 1973 by W. W. Billings and assigned to the assignee of the present invention is disclosed a solid state power controller in a form to minimize the requirements of the power supply for energizing internal circuits such as control and protection circuits and including the zero crossover circuit of the apparatus. The present invention is directed to a preferred form of zero crossover circuit suitable for use in the apparatus of the copending application.

SUMMARY OF THE INVENTION

In accordance with this invention, a zero crossover detecting circuit is provided including a halfwave rectifier developing halfwave rectified signals from the AC supply, the halfwave rectified signal charging a capacitor whose maximum voltage is limited to a predetermined level, such as by a Zener diode, and a logic gate or other voltage level detector is connected to be responsive to the charged condition of the capacitor to produce an output pulse when the voltage to the input of the logic gate is at least a predetermined value in relation to the voltage occurring at the same time across the capacitor. This zero crossover circuit requires no power to be supplied apart from the AC voltage and may be used in power controllers for precisely controlling the switching of solid state switches.

The circuit of this invention not only achieves the purposes of providing a self-powered zero crossover circuit but it is also one that demonstrates accurate and reliable performance and can be built in a highly miniaturized hybrid electronic form with low power dissipation. It is adaptable to different voltage and frequency systems and can be applied for resistive-capacitive output coupling or optical output coupling where an isolated output is required. Furthermore, pulses can be obtained at either the negative going crossover or the positive going crossover of the AC wave merely by interchanging input terminals.

While the present invention is particularly suitable for use in systems such as that described in the copending application it will be understood that it is not so limited that it may be otherwise applied in the various known applications of zero crossover circuits.

DESCRIPTION OF THE PREFERRED EMBODIMENT

Figures 1, 2:
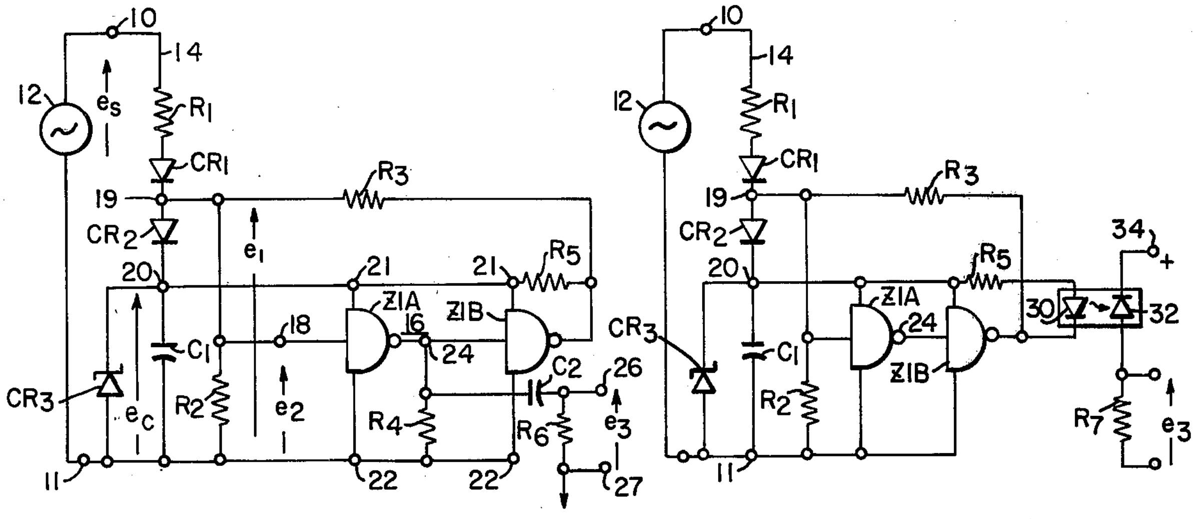
FIGS. 1 and 2 are schematic diagrams of embodiments of the present invention.

Referring to FIG. 1, a zero crossover circuit is illustrated that has a pair of input terminals 10 and 11 connected across an AC voltage supply 12. Between the input terminals 10 and 11 is a series circuit branch 14 including a resistor R1, a first diode rectifier CR1, a second diode rectifier CR2 poled in the same direction as CR1, and a capacitor $C_1$. In parallel connection across capacitor $C_1$ is a voltage reference diode, such as a zener diode CR3, that is poled in the opposite direction to CR1 and CR2.

The circuit also includes a voltage level detector 16 which in this example is a logic gate comprising two NAND gate stages Z1A and Z1B that are sequentially connected together. The first logic gate stage Z1A has an input 18 connected to the common point 20 between rectifiers CR1 and CR2 and has supply terminals 21 and 22 connected respectively across the capacitor C1. The second logic gate stage Z1B has its input connected directly to the output of the first stage Z1A at point 24 and also has supply terminals 21 and 22 connected across the capacitor C1. The output of Z1B is connected through feedback resistor R3 to the input 18 of Z1A and to point 19 between CR1 and CR2. The output of Z1B is also connected to one side of capacitor C1 through resistor R5.

The input 18 of Z1A is also connected through resistor R2 to the low side of capacitor C1 or the common line to input terminal 11. The input 24 of Z1B is also connected through a resistor R4 to input terminal 11. Point 24 is connected through a capacitor-resistor network comprising the elements C2 and R6 to output terminals 26 and 27 of the circuit.

In operation the AC supply voltage, limited by dropping resistor R1, is halfwave rectified by diode rectifiers CR1 and CR2 with the halfwave rectified signal applied to charge capacitor C1 to a voltage limited by the breakdown level of the voltage reference Zener diode CR3. The breakdown level of CR3 is chosen to be less than the peak of the AC wave. This provides a relatively constant direct voltage across the capacitor C1 during each positive half cycle. At the end of a positive half cycle, CR2 blocks when the instantaneous supply voltage at the junction point 19 between CR1 and CR2 is less than the voltage across the capacitor C1. This can be expressed by the relationship $$e_1 \approx \left(\frac{R1}{R1+R2}\right) \cdot e_s \leq e_c$$

where $e_1$, $e_s$, and $e_c$ are respectively voltages at point 19, point 10, and point 20 in relation to point 11.

The logic gate 16 elements Z1A and Z1B are connected to provide positive feedback between the output of Z1B and the input 18 of Z1A, through resistor R3, in a manner similar to that known as a Schmitt trigger circuit. During all negative half cycles and that portion of positive half cycles until the requisite condition occurs that CR2 is blocking, the second section Z1B is non-conducting. The logic or triggering circuit of the elements Z1A and Z1B will fire when its input voltage $e_2$ is approximately 50% of the value of $e_c$. In preferred form the NAND gates Z1A and Z1B are sections of a CMOS (complementary metal-oxide-semiconductor) integrated logic gate as presently commercially available which provides this threshold feature of the voltage at the input ($e_2$) in relation to that at the supply terminal 21 ($e_c$) of about 50%.

The voltage level detector 16 may take various forms in accordance with known electronic circuit practices. Besides logic gates it may principally comprise such things as a flip-flop, an operational amplifier, a Schmitt trigger circuit, or a differential amplifier type of voltage level detector as disclosed in Billings U.S. Pat. No. 3,480,834. Of these alternatives the Schmitt trigger circuit would be attractive from the standpoint of not requiring an additional power supply.

When the portion of the instantaneous AC supply voltage $e_2$, which appears across the resistor R2, passes through this threshold value, the trigger circuit comprising portion Z1A and Z1B snaps into conduction. Since their source of voltage input is capacitor C1, this capacitor is rapidly discharged at a rate determined by the values of C1 and R5. A resulting pulse appears across R4 as a positive spike voltage with a sharp reset time and an exponential decay.

In FIG. 1 a circuit is shown with resistive capacitive output coupling provided by the network of elements R6 and C2 between point 24 and output terminals 26 and 27. R6 and C2 act as a differentiating network that passes the sharp, short duration, positive pulses at zero crossover but block the difference in potential between the zero crossover circuit and the pulse output notes.

Figure 3:
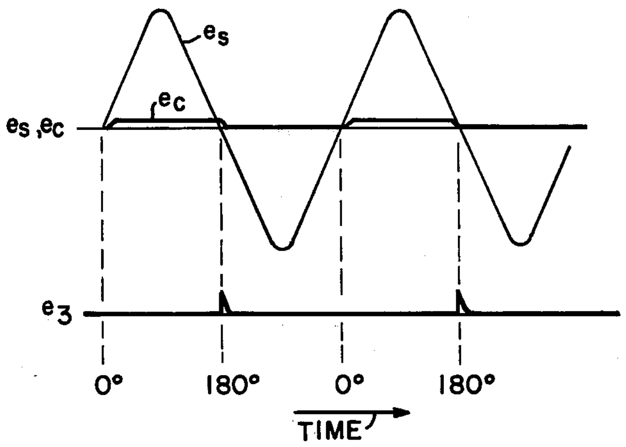
FIG. 3 is a set of waveforms useful in understanding an operation of the embodiments of FIGS. 1 and 2.

FIG. 3 illustrates waveforms of the various voltages referred to in connection with FIG. 1. If the input terminals from the AC supply were reversed, the output pulses represented by waveform $e_3$ would occur at the positive going zero crossovers, at zero degrees, rather than at the negative going crossovers, or 180° as shown.

Referring now to FIG. 2 a form of the invention is shown that is substantially similar to that of FIG. 1 except for the manner in which the output signal is derived from the trigger circuit. In this embodiment the output to input connection 24 between Z1A and Z1B is free of connection to other elements. Rather the output of Z1B is connected through a diode 30 that is optically responsive, that is, produces radiation upon the application of a predetermined magnitude voltage thereacross. Various known forms of light emitting diodes may be selected for this purpose. The optically responsive diode 30 is in optically coupled relationship with an optically sensitive device or photodiode 32 that is in an isolated output circuit including the diode resistor R7 across which the desired output pulses are produced. In this embodiment an additional supply of DC potential is required to be connected to one terminal 34 of the optically responsive diode 32 in the output circuit. This may be a drawback but provides the advantage of improved isolation. The required DC potential, typically about 5–15v., may be otherwise available in the system in which the crossover circuit is used and thus not require an independent supply.

Figure 4:
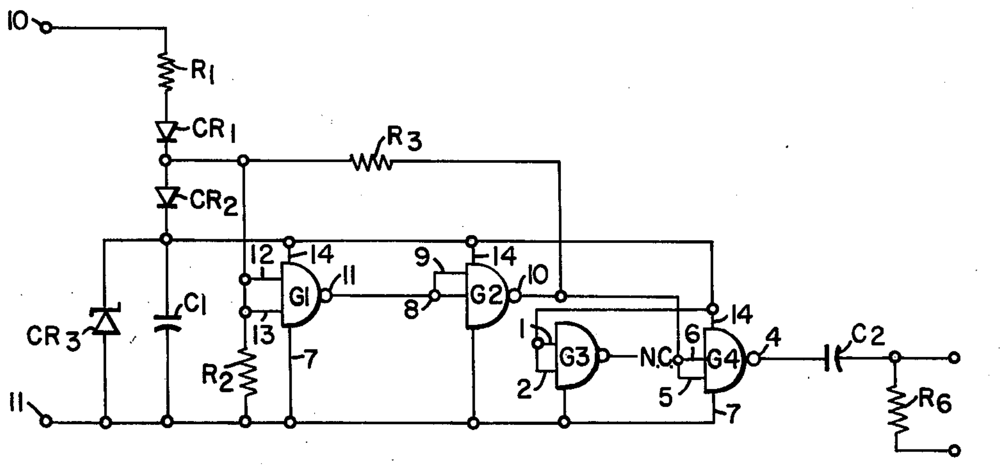
FIG. 4 is a schematic diagram of a further example of the invention.

By way of further example, reference is now made to the circuit of FIG. 4 which illustrates a zero crossover circuit in accordance with this invention as implemented in the power controller described more fully in the copending application and containing the following elements specifically identified merely by way of example for use in power controllers of that nature, where, in this example, the supply voltage is 400 Hz, 230v.

| | |
|---|---|
| Resistor R1 | 500,000 ohms |
| Diode CR1 | 1N649 |
| Diode CR2 | 1N914 |
| Diode CR3 | 12 v. Zener |
| Capacitor C1 | 0.047 mf., 50 v. |
| Resistor R2 | 200,000 ohms |
| Resistor R3 | 250,000 ohms |
| Capacitor C2 | 250 pf., 100 v. |
| Resistor R6 | 50,000 ohms |
| Logic Gates G1, G2, G3, G4 | Sections of RCA/CD4011 CMOS type Quad NAND |

Actual operation of circuits in accordance with this invention has demonstrated accurate, reliable and temperature stable performance with low power dissipation, such as on the order of 1/10 watt for 230 volt systems and 1/20 watt for 115 volt systems. The circuit is amenable to highly miniaturized fabrication in hybrid form and offers considerable versatility as far as the voltage and frequency of the system with which it is applied is concerned. It also has other desirable qualities in addition to that of being essentially self-powered; such as being able to provide electrical isolation of output signals by the RC differentiating network of FIGS. 1 and 4 on the optical isolator of FIG. 2.

We claim:

1. A circuit for producing an output pulse at a zero crossover point of a supplied AC voltage waveform and requiring no power to be supplied apart from the supplied AC voltage, comprising:

half wave rectifier means including a pair of like poled serially connected diode rectifiers;

a capacitor serially connected with said half wave rectifier means and comprising with said rectifier means a circuit branch having a pair of terminals for connection across an AC voltage supply;

a voltage reference diode connected across said capacitor;

a voltage level detector having an input connected to be responsive to the charge condition of said capacitor and to produce an output pulse when voltage to the input of said detector is a predetermined value of the voltage occurring at the same time across said capacitor said detector comprising first and second logic gate stages, said first stage having an input that is said input of said voltage level detector and having an output that is directly connected to an input of said second stage, and said stage having an output coupled through a feedback circuit path to said input of said first stage; and, a resistor-capacitor network connected to an output of one of said stages.

2. The subject matter claim 1 wherein: said voltage level detector is characterized by having a threshold voltage that is a fraction of the maximum voltage to which said capacitor is charged.

3. A circuit for producing an output pulse at a zero crossover point of a supplied AC voltage waveform and requiring no power to be supplied apart from the supplied AC voltage, comprising:

half wave rectifier means including a pair of like poled serially connected diode rectifiers;

a capacitor serially connected with said half wave rectifier means and comprising with said rectifier means a circuit branch having a pair of terminals for connection across an AC voltage supply:

a voltage reference diode connected across said capacitor;

a voltage level detector having an input connected to be responsive to the charge condition of said capacitor and to produce an output pulse when the voltage to the input of said detector is a predetermined value of the voltage occurring at the same time across said capacitor, said detector comprising first and second logic gate stages, said first stage having an input that is said input of said voltage level detector and having an output that is directly connected to an input of said second stage, and said stage having an output coupled through a feedback circuit path to said input of said first stage; and, an optically responsive solid state device is connected to an output of said detector and an optically sensitive solid state device is in optically coupled relation with said optically responsive device.

* * * * *